(12) United States Patent
Cantrell

(10) Patent No.: US 7,912,924 B1
(45) Date of Patent: Mar. 22, 2011

(54) ADDING FUNCTIONALITY WITH RESPECT TO ONE OR MORE WEB PAGES

(75) Inventor: Christian Cantrell, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 718 days.

(21) Appl. No.: 11/936,004

(22) Filed: Nov. 6, 2007

(51) Int. Cl.
*G06F 15/16* (2006.01)
*G06F 17/27* (2006.01)

(52) U.S. Cl. ......................................... 709/219; 715/249

(58) Field of Classification Search ................... 345/680; 709/203, 210, 217, 229; 707/610, 612; 715/236, 715/239, 249, 277, 746; 719/328
See application file for complete search history.

(56) References Cited

U.S. PATENT DOCUMENTS

| | | | |
|---|---|---|---|
| 6,687,745 B1 | 2/2004 | Franco et al. | |
| 2003/0074421 A1* | 4/2003 | Kusano et al. | 709/219 |
| 2005/0038796 A1* | 2/2005 | Carlson et al. | 707/100 |
| 2006/0184540 A1* | 8/2006 | Kung et al. | 707/10 |
| 2007/0033155 A1* | 2/2007 | Landsman | 707/1 |
| 2007/0118609 A1* | 5/2007 | Mullan et al. | 709/217 |
| 2008/0127217 A1* | 5/2008 | Wang | 719/318 |
| 2009/0015599 A1* | 1/2009 | Bennett et al. | 345/680 |

OTHER PUBLICATIONS

Title: "Apollo Developer FAQ" Publisher: http://labs.adobe.com/wiki/index.php/Apollo Date: Aug 7, 2006 Author: Adobe.*
Title: "Adobe Apollo=Acrobat Reader+Flash Player" Publisher: http://labnol.blogspot.com/2005/12/adobe-apollo-acrobat-reader-flash.html Date: Jul. 2006 Author: Agarwal.*
Mike Chambers, Adobe Developer Connection—Logged In—Introducing Apollo, www.adobe.com/devnet/logged_in/mchambers_apollo.html, 3 pgs., created Mar. 19, 2007, printed from Web on Nov. 6, 2007.
Adobe Labs, AIR: Developer FAQ, http://labs.adobe.cm/wiki/index.php/AIR::Developer_FAQ, 14 pgs., last update Oct. 9, 2007, printed from Web on Nov. 6, 2007.

* cited by examiner

*Primary Examiner* — Wing F Chan
*Assistant Examiner* — Jonathan Willis
(74) *Attorney, Agent, or Firm* — Fish & Richardson P.C.

(57) ABSTRACT

In general, one aspect of the subject matter described in this specification can be embodied in a method that includes loading one or more web pages from a remote server site using a web rendering engine on a local computer, wherein the one or more web pages are confined to a sandbox within the local computer; retrieving data from outside the sandbox within the local computer; and adding functionality, with respect to the one or more web pages, to a user interface by translating the data from a first data format employed by the local computer and sending the translated data to the web rendering engine. Other embodiments of this aspect include corresponding systems, apparatus, and computer program products.

13 Claims, 4 Drawing Sheets

ADDING FUNCTIONALITY WITH RESPECT TO ONE OR MORE WEB PAGES

BACKGROUND

The present disclosure relates to employing web pages retrieved from a network in constructing a new application on a local computer.

A user can use a web browser to view web pages. Web pages can include text, images, and other multimedia objects. A user can request a web page, for example, by typing a URL (Uniform Resource Locator) into the web browser, or by selecting a hypertext link that references the page. A server-name portion of the URL can be resolved into an IP (Internet Protocol) address by using the DNS (Domain Name System). The web browser can request the web page from a web server associated with the IP address by sending an HTTP (HyperText Transfer Protocol) request. The web server can send to the client machine running the web browser an HTML (HyperText Markup Language) document, along with graphics and other files associated with the requested page. The web browser can parse and render the HTML, incorporating images and other resources as necessary.

SUMMARY

This specification describes technologies relating to adding functionality with respect to one or more web pages to create a new application on a local computer.

In general, one aspect of the subject matter described in this specification can be embodied in a method that includes loading one or more web pages from a remote server site using a web rendering engine on a local computer, wherein the one or more web pages are confined to a sandbox within the local computer; retrieving data from outside the sandbox within the local computer; and adding functionality, with respect to the one or more web pages, to a user interface by translating the data from a first data format employed by the local computer and sending the translated data to the web rendering engine. Other embodiments of this aspect include corresponding systems, apparatus, and computer program products.

These and other embodiments can optionally include one or more of the following features. The translating can include translating the data between the first data format and a second data format employed by the remote server site. The translating can include translating the data between the first data format, which is employed by a software application installed on the local computer, and a universal resource identifier format employed by the remote server site.

The method can include: presenting the user interface including at least a portion of the one or more web pages, rendered using the web rendering engine, and an identifier for the data; receiving input through the user interface selecting the data; and performing the translating and the sending in response to the selecting. Receiving the input can include receiving a drag-and-drop operation that drags and drops the identifier for the data onto the rendered portion of the one or more web pages. Moreover, using the web rendering engine can include using a cross-operating system (OS) application execution environment having the web rendering engine embedded therein, and the loading, the retrieving and the adding are performed by a desktop application configured to run in the cross-OS application execution environment.

Particular embodiments of the subject matter described in this specification can be implemented to realize one or more of the following advantages. Web developers can use familiar programming languages to build and deploy rich internet applications to the desktop. Functionality can be readily added to existing web pages, using data read from or stored to a local machine. Desktop application features, such as drag and drop, operating system integration, background processing, installation and uninstallation, system notifications, context menu features, and offline synchronization, can be readily added to rich internet applications that run in a cross operating system runtime environment. Rich internet applications with desktop functionality can be quickly developed and deployed, in part using content and functionality provided by existing web sites, without regard to the operating system on which the applications will run. The ease of development and usability for internet applications can be increased, at least in part, due to the provision of a full web rendering engine to applications to be developed.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
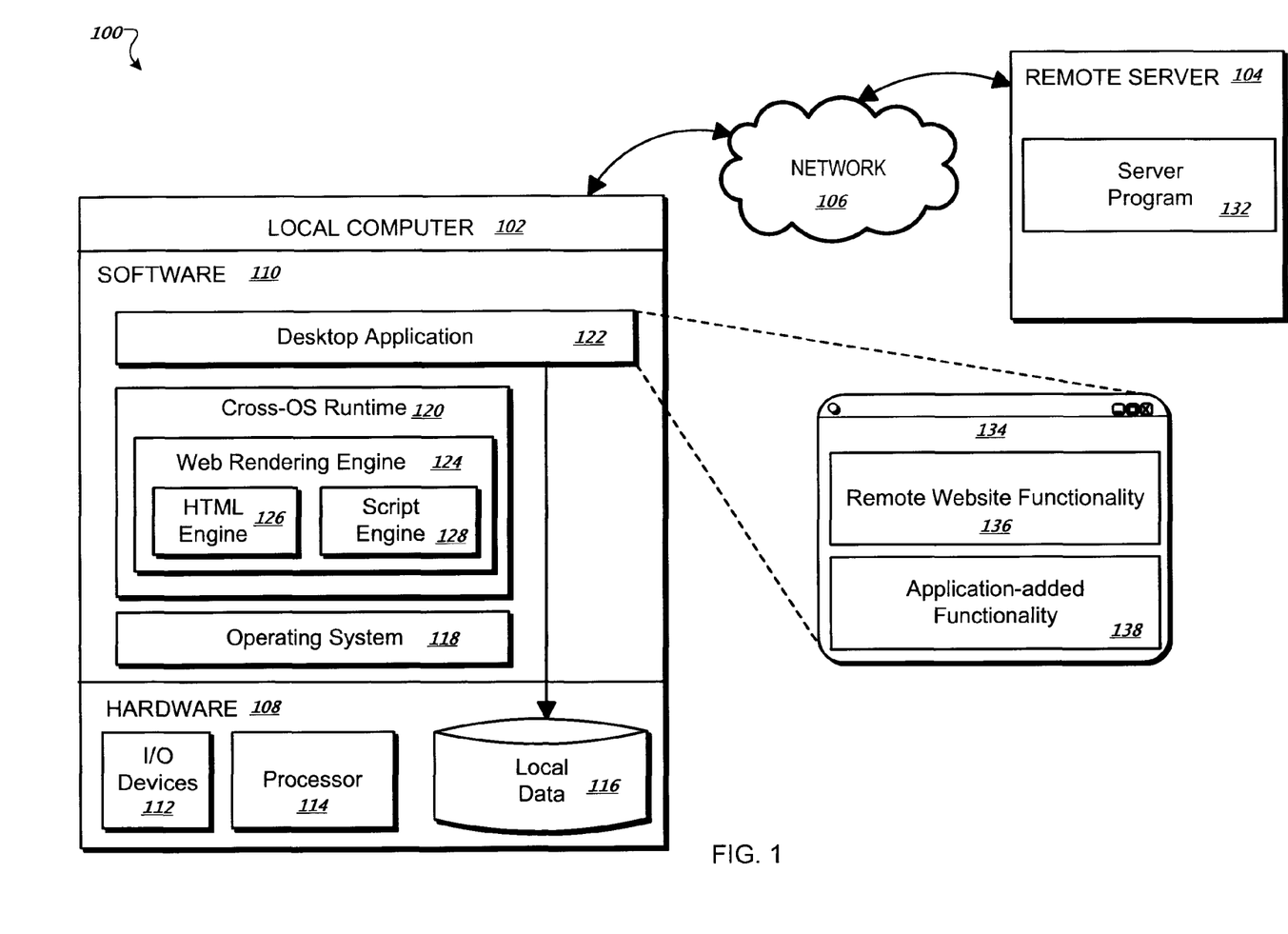
FIG. 1 is a block diagram showing an example system for adding functionality to a web page.

FIG. 1 is a block diagram showing an example system 100 for adding functionality to a web page. The system 100 is an example of a system in which the systems, components and techniques described below can be implemented. Although several components are illustrated, there may be fewer or more components in the system 100. The system 100 includes a local computer 102, which can communicate with a remote server 104 over a network 106. The local computer 102 can be, for example, a desktop computer or a mobile device, such as a laptop computer, PDA (Personal Digital Assistant), cellular telephone, gaming device, media player, portable email device, or combinations of these. The network 106 can be a wired or wireless network, such as the Internet, a LAN (Local Area Network) or WAN (Wide Area Network).

The local computer 102 includes hardware components 108 and software components 110. The hardware components 108 include I/O (Input/Output) devices 112, a processor 114 and computer readable medium 116 (e.g., hard disk, volatile or non-volatile memory, etc.) for storing local data and software. The software components 110 include an operating system (OS) 118, a cross-OS runtime component 120, and a desktop application 122. In some implementations, the cross-OS runtime component 120 includes a web rendering engine 124. In other implementations, the web rendering engine 124 is not included in the cross-OS runtime component 120, but is included in the software components 110 as a separate component. The web rendering engine 124 includes an HTML (HyperText Markup Language) engine 126 and a script engine 128.

The operating system 118 manages the resources of the local computer 102, such as the hardware components 108.

The I/O devices 112 accept input from and provide output to users of the local computer 102. The I/O devices 112 can include a keyboard, mouse, terminal display, and printer, to name a few examples. The processor 114 executes programming instructions, such as instructions associated with the desktop application 122. In some implementations, the processor 114 is a single-threaded processor. In other implementations, the processor 114 is a multi-threaded processor. The processor 114 can include multiple processing cores. Local data in medium 116 can include, for example, local files, such as multi-media files, locally-stored personal contact information, locally-stored transaction information, locally-stored RSS (Really Simple Syndication) information, Internet bookmarks, and personal task lists.

The HTML engine 126 parses and renders HTML. For example, the HTML engine 126 can parse and render HTML included in web pages received from the remote server 104. The script engine 128 decodes and interprets a script as a series of instructions that are carried out when the script is run. A script can be used to programmatically control an application. The script engine can be associated with a particular scripting language, such as the JavaScript scripting language.

The cross-OS runtime 120 enables applications (such as the desktop application 122) to run on multiple operating systems. The cross-OS runtime 120 can enable the desktop application 102 to run on Microsoft® Windows® (available from Microsoft® Corporation of Redmond, Wash.) and also Mac OS® (available from Apple®, Inc. of Cupertino, Calif.). For example, the cross-OS runtime 120 can be the Adobe® Integrated Runtime (AIR™) environment provided by Adobe Systems Incorporated of San Jose, Calif.

The remote server 104 can be one or more server computers in one or more locations. The remote server 104 includes a server program 132. The server program 132 can accept requests for web pages, for example from the local computer 102. The server program 132 can send web pages (e.g., static pages, dynamically-created pages) to requesting devices across the network 106.

The desktop application 122 can request one or more web pages from the remote server 104. The desktop application 122 can present a user interface 134. The user interface 134 can include functionality 136 offered by the remote server 104 (e.g., content provided by the remote server 104 can be displayed in an area of the user interface 134). For example, the desktop application 122 can use the web rendering engine 124 to load and present web pages, or portions of web pages, received from the remote server 104, in the user interface 134. In some implementations, the user interface 134 can display web pages but not allow a user to navigate off of the displayed page (i.e., the user interface 134, unlike a traditional web browser, may not allow the user to directly enter a web address).

The remote website functionality 136 can be confined to a sandboxed environment. That is, remote website functionality 136, such as downloaded scripts, can be prevented from accessing the medium 116 (e.g., hard drives, memory), network resources, or the I/O devices 112 in an unauthorized fashion, as with a traditional web browser.

The desktop application 122 can add functionality not offered by the remote server 104. For example, the desktop application 122 can access information from local data in the medium 116, translate the retrieved information from a format employed by the local computer to a format employed by the remote server 104, and send the translated data to the web rendering engine 124. In response to receiving the translated data, the web rendering engine 124 can request one or more web pages from the remote server 104.

In some implementations, some of the local data in medium 116 is in a format employed by a software application installed on the local computer 102 (i.e., an application other than the desktop application 122). For example, the desktop application 122 can retrieve personal contact information stored in a vCard file format used by an email application.

In some implementations, the user interface 134 can present added functionality 138 (e.g., in an area separate from that used for the website functionality 136) identifiers for data retrieved from local data in medium 116. For example, the user interface 134 can present selectable images representing personal contacts associated with retrieved vCard information. The desktop application can associate respective local data in medium 116 with each identifier (e.g., name and address information can be associated with each selectable personal contact image). The user can provide a user input to select an identifier (e.g., by selecting a respective image), and in response to the user input the desktop application can translate the associated local data to a server-supported format. For example, the user can select an image representing a personal contact (e.g., in an area set aside for added functionality 138), drag and drop the contact onto a different area of the user interface (e.g., an area set aside for website functionality 136) and in response the desktop application 122 can translate the address information associated with the image into a URL (Uniform Resource Locator) which includes embedded address information. The desktop application 122 can send the URL to the remote server 104, and in response the remote server 104 can send a web page to the local computer 102. The web rendering engine 124 can then be used to load and present the received web page in the user interface 134.

Figure 2:
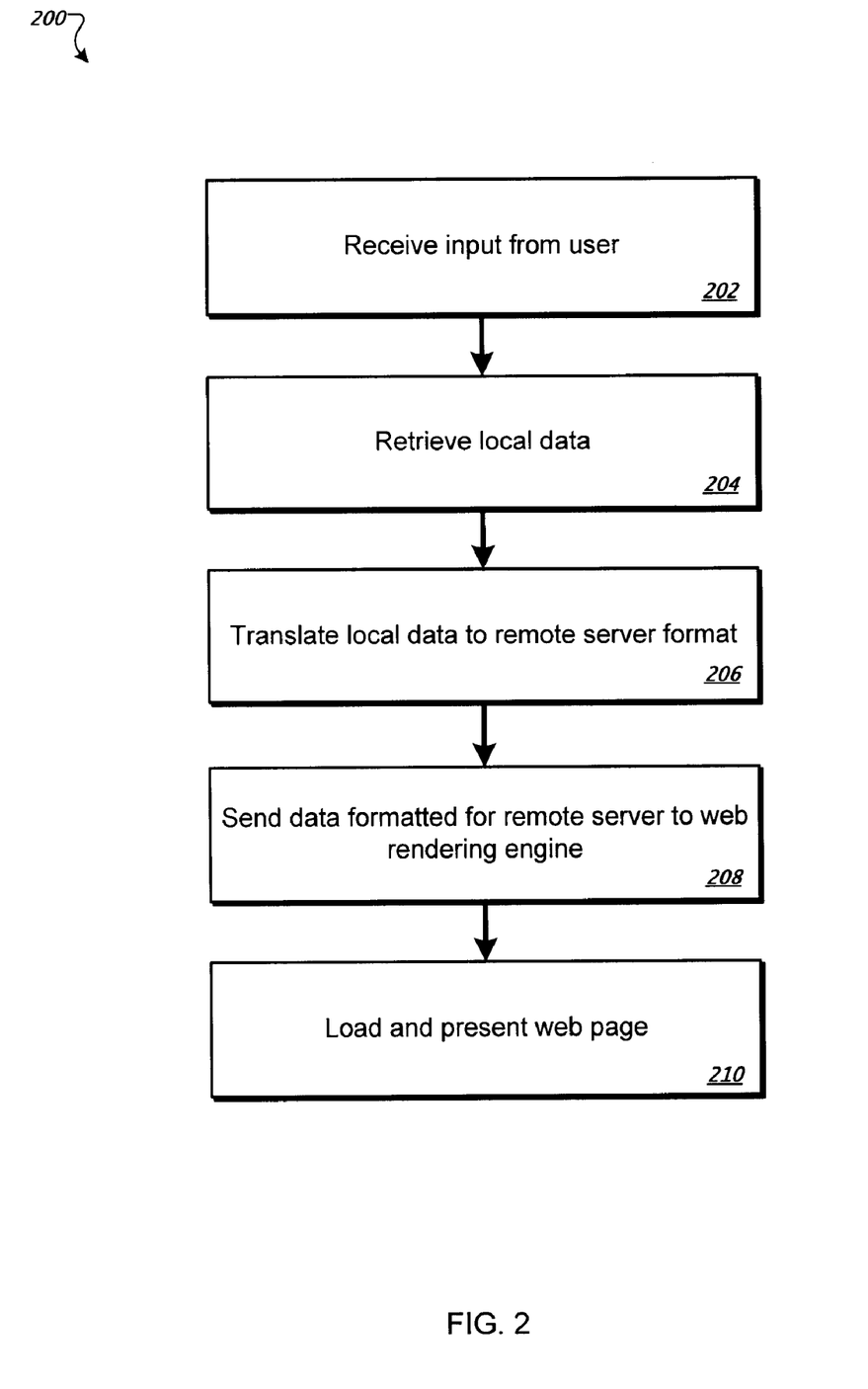
FIG. 2 shows an example process of loading and presenting a web page.

FIG. 2 shows an example process 200 of loading and presenting a web page. The process 200 can be performed, for example, by the local computer 102. Input can be received 202 from the user. For example, a user can select a user interface item representing a personal contact. Local data can be retrieved 204. For example, address information associated with the selected personal contact can be retrieved from a local file containing vCard information. The local data can be translated 206 to a remote server format. For example, the retrieved address information can be encoded into a URL format recognizable by the remote server 104. As another example, the retrieved address information can be embedded into scripting statements (e.g., JavaScript function calls) recognizable by the remote server 104. Data formatted for the remote server can be sent 208 to the web rendering engine. For example, the formatted data can be sent to the web rendering engine 124. The web rendering engine 124 can send a request to the remote server 104, where the request includes data formatted for the remote server (e.g., a URL). The remote server, in response to the request, can send one or more web pages to the local computer 102. A web page can be loaded and presented 210. For example, the web rendering engine 124 can parse and render (e.g., using the HTML engine 126 and the script engine 128) the received web page(s). The web pages can be displayed, for example, in the user interface 134.

Figure 3:
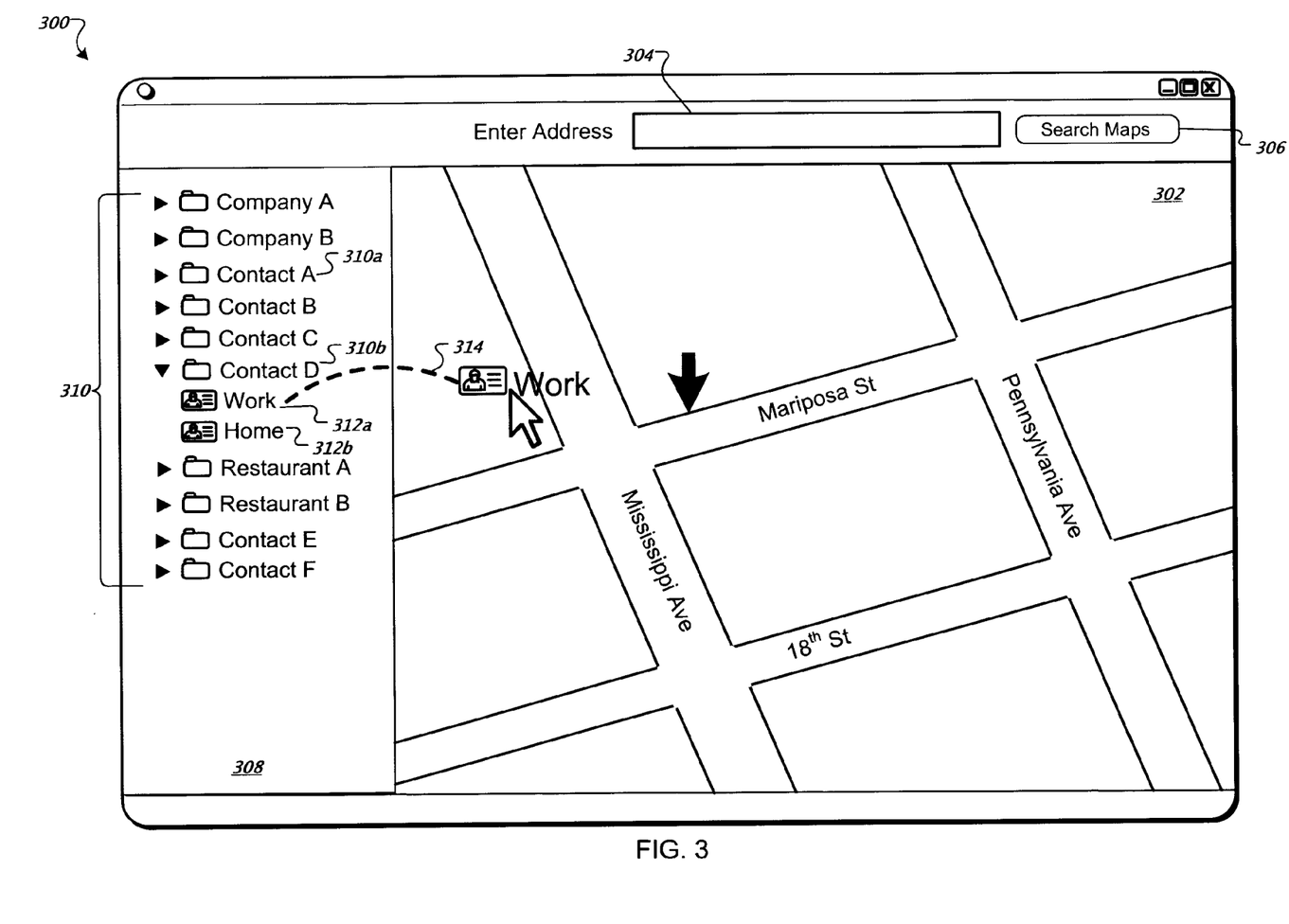
FIG. 3 shows an example user interface for mapping addresses associated with locally-stored personal contacts.

FIG. 3 shows an example user interface 300 for mapping addresses associated with locally-stored personal contacts. The interface 300 can be displayed, for example, by the desktop application 122. The interface 300 includes an area 302 for displaying a map. The user can enter an address into a text field 304 and a map of the entered address can be displayed in the area 302 in response to the selection of a search button 306.

Map information can be requested of and received from a remote server (e.g., 104) configured to offer mapping services. The remote server 104 can send a web page including HTML formatted to display a map including the requested address. The web rendering engine 124 can parse the received HTML and render it in the area 302.

The interface 300 includes an area 308 for displaying personal contact information. The area 308 includes contact indicators 310, such as indicators 310a-b. Upon startup, the desktop application 122 can read local vCard information (e.g., from a file containing vCard information stored in local data in medium 116) and present a contact indicator 310 in the area 308 for each retrieved contact.

Respective contact information (e.g., name, home address, work address) can be associated with each contact indicator. The contact indicators 310 can be expanded, as illustrated by the expanded contact indicator 310b. Address indicators 312a-b are displayed beneath the expanded contact indicator 310b, indicating addresses associated with the respective contact (e.g., contact information retrieved from locally-stored vCard information can include associated work and home addresses).

The user can drag an address indicator 312 and drop it onto the area 302. Here, a dashed line 314 illustrates the dragging and dropping of the address indicator 312a. In response to the dropping of an address indicator 312 on the area 302, the application can translate the address information associated with the address indicator 312 into a format recognizable by the remote server 104. For example, address information associated with the address indicator 312a can be embedded into a URL in a format recognizable by the remote server 104.

As another example, address information can be embedded into scripting statements (e.g., JavaScript function calls) recognizable by the remote server 104. The server-recognizable address data can be sent to the remote server 104, and the remote server 104 can send an updated web page (or portion of a web page) which includes HTML formatted to display a map including the address associated with the selected address indicator. The web rendering engine 124 can parse and render the received HTML, resulting in the display of an updated map in the area 302.

Figure 4:
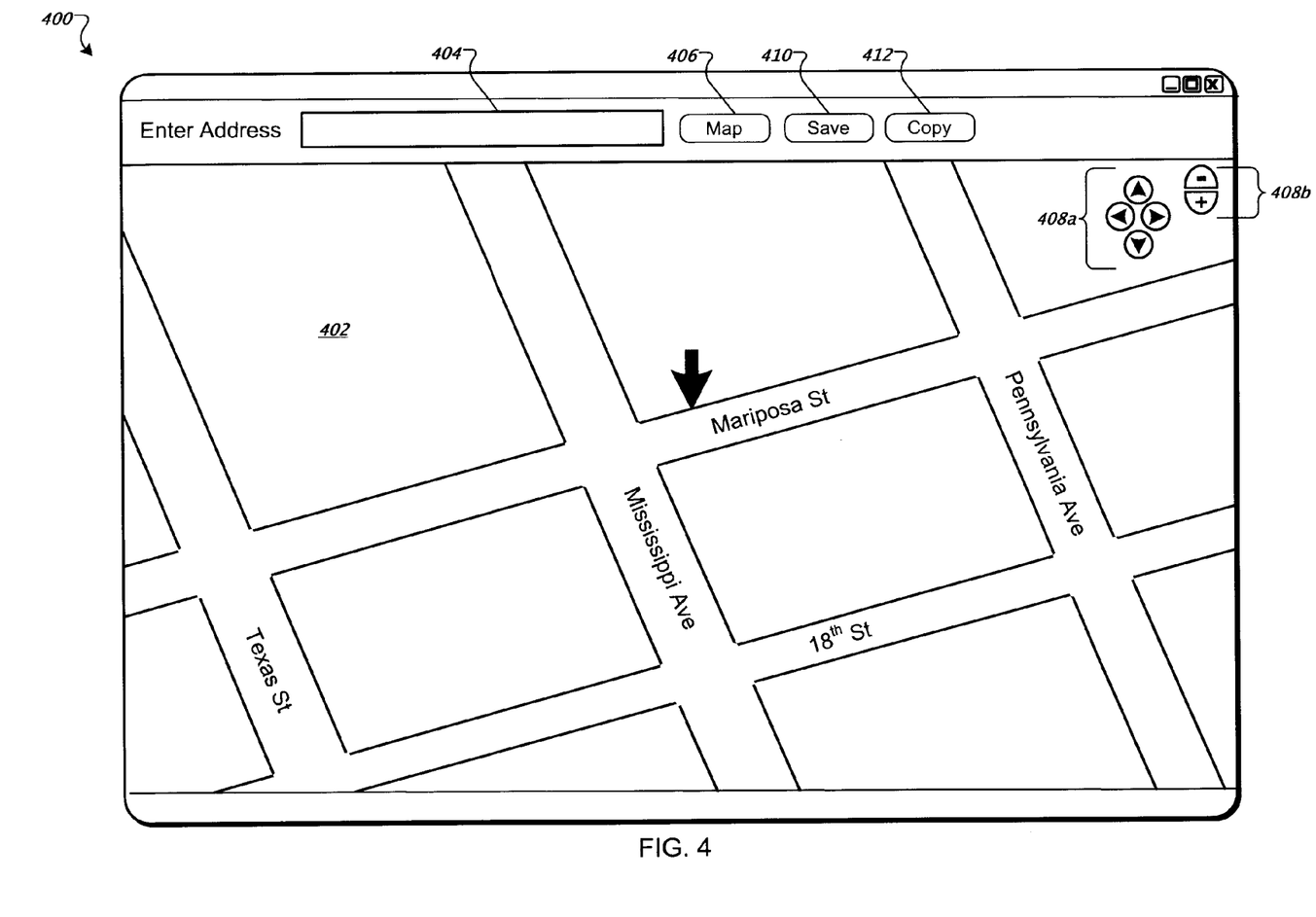
FIG. 4 shows an example user interface for saving server-produced maps offline.

FIG. 4 shows an example user interface 400 for saving server-produced maps offline. The interface 400 can be displayed, for example, by the desktop application 122. The interface 400 includes an area 402 for displaying a map. The user can enter an address into a text field 404 and a map of the entered address can be displayed in the area 402 in response to the selection of a map button 406. The user can pan and zoom the displayed map using control buttons 408a-b. The user can save an image of the displayed map to a file stored in local data in medium 116 by selecting a save button 410. The user can select a copy button 412 to send a copy of an image of the displayed map to a clipboard associated with the local computer 102, enabling the user to paste the copied image into another application running on the local computer 102.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, although the two specific application examples are both mapping programs, it will be appreciated that the present systems and techniques can be used to create many different types of applications integrated with websites.

What is claimed is:

1. A computer-implemented method comprising:
   loading one or more web pages from a remote server site using a web rendering engine on a local computer, wherein the one or more web pages are confined to a sandbox within the local computer;
   presenting the user interface including at least a portion of the one or more web pages rendered using the web rendering engine, and an identifier for the data located outside the sandbox within the local computer;
   receiving input through the user interface selecting the data;
   retrieving the data from outside the sandbox within the local computer; and
   adding functionality, with respect to the one or more web pages, to the user interface by, in response to the selecting, translating the data from a first data format employed by the local computer and sending the translated data to the web rendering engine;
   wherein the translating comprises translating the data between the first data format and a second data format employed by the remote server site.

2. The method of claim 1, wherein the translating comprises translating the data between the first data format, which is employed by a software application installed on the local computer, and a universal resource identifier format employed by the remote server site.

3. The method of claim 1, wherein receiving the input comprises receiving a drag-and-drop operation that drags and drops the identifier for the data onto the rendered portion of the one or more web pages.

4. The method of claim 1, wherein using the web rendering engine comprises using a cross-operating system (OS) application execution environment having the web rendering engine embedded therein, and the loading, the retrieving and the adding are performed by a desktop application configured to run in the cross-OS application execution environment.

5. A non-transitory computer-readable medium encoding a computer program product operable to cause a data processing apparatus to perform operations comprising:
   loading one or more web pages from a remote server site using a web rendering engine on a local computer, wherein the one or more web pages are confined to a sandbox within the local computer;
   presenting the user interface including at least a portion of the one or more web pages rendered using the web rendering engine, and an identifier for the data located outside the sandbox within the local computer;
   receiving input through the user interface selecting the data;
   retrieving the data from outside the sandbox within the local computer; and
   adding functionality, with respect to the one or more web pages, to the user interface by, in response to the selecting, translating the data from a first data format employed by the local computer and sending the translated data to the web rendering engine;
   wherein the translating comprises translating the data between the first data format and a second data format employed by the remote server site.

6. The non-transitory computer-readable medium of claim 5, wherein the translating comprises translating the data between the first data format, which is employed by a software application installed on the local computer, and a universal resource identifier format employed by the remote server site.

7. The non-transitory computer-readable medium of claim 5, wherein receiving the input comprises receiving a drag-and-drop operation that drags and drops the identifier for the data onto the rendered portion of the one or more web pages.

8. The non-transitory computer-readable medium of claim 5, wherein using the web rendering engine comprises using a cross-operating system (OS) application execution environment having the web rendering engine embedded therein, and the loading, the retrieving and the adding are performed by a desktop application configured to run in the cross-OS application execution environment.

9. A system comprising:
a network;
a remote server site coupled with the network; and
a local computer coupled with the network and operable to generate a user interface for a desktop application by performing operations comprising:
loading one or more web pages from a remote server site using a web rendering engine on a local computer, wherein the one or more web pages are confined to a sandbox within the local computer;
presenting the user interface including at least a portion of the one or more web pages rendered using the web rendering engine, and an identifier for the data located outside the sandbox within the local computer;
receiving input through the user interface selecting the data;
retrieving the data from outside the sandbox within the local computer; and
adding functionality, with respect to the one or more web pages, to the user interface by, in response to the selecting, translating the data from a first data format employed by the local computer and sending the translated data to the web rendering engine;
wherein the translating comprises translating the data between the first data format and a second data format employed by the remote server site.

10. The system of claim 9, wherein the local computer comprises a portable computing device, and the network comprises a wireless network.

11. The system of claim 9, wherein the translating comprises translating the data between the first data format, which is employed by a software application installed on the local computer, and a universal resource identifier format employed by the remote server site.

12. The system of claim 9, wherein receiving the input comprises receiving a drag-and-drop operation that drags and drops the identifier for the data onto the rendered portion of the one or more web pages.

13. The system of claim 9, wherein using the web rendering engine comprises using a cross-operating system (OS) application execution environment having the web rendering engine embedded therein, and the loading, the retrieving and the adding are performed by a desktop application configured to run in the cross-OS application execution environment.

* * * * *

UNITED STATES PATENT AND TRADEMARK OFFICE
CERTIFICATE OF CORRECTION

| | | |
|---|---|---|
| PATENT NO. | : 7,912,924 B1 | Page 1 of 1 |
| APPLICATION NO. | : 11/936004 | |
| DATED | : March 22, 2011 | |
| INVENTOR(S) | : Christian Cantrell | |

It is certified that error appears in the above-identified patent and that said Letters Patent is hereby corrected as shown below:

IN THE CLAIMS:

Column 8, line 11, (line 6 of claim 1) please delete "the" and insert therefor -- a --.

Column 8, line 13, (line 8 of claim 1) please delete "the".

Column 8, line 49, (line 8 of claim 5) please delete "the" and insert therefor -- a --.

Column 8, line 51, (line 10 of claim 5) please delete "the".

Column 9, line 27, (line 13 of claim 9) please delete "the".

Signed and Sealed this
Sixteenth Day of August, 2011

David J. Kappos
*Director of the United States Patent and Trademark Office*